(12) United States Patent
Noe

(10) Patent No.: US 6,935,471 B2
(45) Date of Patent: Aug. 30, 2005

(54) ACTIVE DYNAMIC BEATER

(75) Inventor: Mathieu Noe, Ballancourt (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/631,692

(22) Filed: Jul. 31, 2003

(65) Prior Publication Data

US 2004/0262110 A1 Dec. 30, 2004

(30) Foreign Application Priority Data

Jun. 26, 2003 (FR) ................................................ 0307721

(51) Int. Cl.[7] .............................. F16F 7/10; F16F 15/03
(52) U.S. Cl. ...................... 188/378; 248/550; 267/136; 267/140.15
(58) Field of Search ................................ 188/378, 379, 188/380; 267/140.14, 140.15, 136; 248/550, 636

(56) References Cited

U.S. PATENT DOCUMENTS

| | | | |
|---|---|---|---|
| 5,251,863 A | | 10/1993 | Gossman et al. |
| 5,478,043 A | * | 12/1995 | Wakui .......................... 188/378 |
| 5,653,317 A | * | 8/1997 | Wakui .......................... 188/378 |
| 5,906,254 A | * | 5/1999 | Schmidt et al. .............. 188/378 |
| 6,170,622 B1 | * | 1/2001 | Wakui et al. ................. 188/378 |
| 6,193,206 B1 | | 2/2001 | Itojima et al. |

FOREIGN PATENT DOCUMENTS

| | | | |
|---|---|---|---|
| EP | 0 821 180 A | 1/1998 | |
| EP | 0 872 662 A | 10/1998 | |
| EP | 1 001 184 A | 5/2000 | |
| FR | 2825769 A1 | * 12/2002 | ............ F16F/15/03 |
| JP | 08312715 A | * 11/1996 | ............ F16F/15/02 |
| WO | WO 93/21687 | 10/1993 | |

OTHER PUBLICATIONS

*Inertia–Wheel Vibration–Damping System*, NTIS Tech Notes, U.S. Department of Commerce, Springfield, VA, Oct. 1, 1990, pp. 854–855.

* cited by examiner

*Primary Examiner*—Thomas Williams
(74) *Attorney, Agent, or Firm*—Alston & Bird, LLP

(57) ABSTRACT

The invention provides a dynamic beater comprising a spring-mass unit, said unit having a mass M and a stiffness K actuated by a drive motor and presenting a device for coupling to a host structure for damping, the beater presenting a first acceleration sensor secured to said mass and delivering a first signal $s_1$, and a second acceleration sensor for mounting on the host structure and delivering a second signal $s_2$, and also having a power amplifier supplying an output signal for controlling the drive motor in response to an input signal E which is a function of a difference between the signals from the first and second acceleration sensors after passing at least one of said signals through at least one lowpass filter and/or phase delay type filter.

6 Claims, 13 Drawing Sheets

ACTIVE DYNAMIC BEATER the present invention relates to an active dynamic beater comprising a spring-mass unit actuated by a drive motor and presenting a device coupling it to a host structure that is to be damped.

BACKGROUND OF THE INVENTION

Dynamic beaters are actuators in widespread use in industry for preventing vibration from propagating in a given structure:

- eliminating vibration at a given frequency (e.g. for a rotary machine);
- damping a natural mode of the structure that can be excited either by harmonic type vibration or by random/impact type vibration.

They operate on the principle of a spring-mass unit. There are several major parameters for beaters:

mass M;

tuned frequency $f_0$;

quality factor Q.

A beater is characterized by its mechanical impedance Z at its fixing interface with the base (or host) structure that is to be damped.

The following notation is used:

F: connection force between the base structure and the beater;

v: the vibratory speed at the point of connection between the base structure and the beater;

Z=F/v then gives the mechanical impedance of the beater, and this characteristic is independent of the base structure.

It can be shown that the complex impedance of the beater can be written as follows (where p is the Laplace variable: $p=j\star\omega$):

$$Z_B = \frac{M*p*\left(Q+\frac{p}{\omega_0}\right)}{Q\left(1+\frac{p^2}{\omega_0^2}\right)+\frac{p}{\omega_0}}$$

having modulus:

$$\|Z\| = \frac{M*w\sqrt{Q^2+\frac{w^2}{\omega_0^2}}}{\sqrt{Q^2\left(\frac{1-w^2}{w_0^2}\right)^2+\frac{\omega^2}{\omega_0^2}}}$$

with:

$\omega=2\pi\star f$, where f is the disturbing frequency;

$\omega_0=2\pi\star f_0$ the natural angular frequency of the beater:
$\omega_0^2=K/M$ Q is related to the stiffness and the damping by:

| | Type of damping | |
|---|---|---|
| | Viscous (C) | With hysteresis |
| | $Q = \frac{\sqrt{KM}}{C}$ | $Q = \frac{1}{\eta}$ |

It can be shown that the maximum value of this impedance is given by:

$$Z_B = M\star\omega_0\sqrt{1+Q^2} \approx M\star\omega_0\star Q \text{ for } Q \geq 3$$

EXAMPLE

It should be observed that the modulus of the impedance is at a maximum at the tuned frequency of the beater, and that the phase is then equal to zero.

At this particular frequency, the beater possesses exactly the characteristics of a viscous damper having a damping coefficient or "viscous resistance" equal to the modulus of Z.

European patent application EP 1 001 184 (Lord Corporation) has already discloses a dynamic beater associated with a structure in which only the first bending mode is treated. For this purpose, two mutually spaced-apart sensors are placed on the cantilever beam to be damped, and a model of the structure fitted with the actuator is used to define the correction relationship that needs to be applied to the reference signal for application to the power amplifier which drives the actuator. The performance of that beater thus depends closely on the suitability of the model used, and it also suffers from risks of instability if the model departs from real conditions when they vary.

OBJECTS AND SUMMARY OF THE INVENTION

An object of the present invention is to enlarge the range of frequencies over which the beater presents a viscous damping characteristic.

Another object of the invention is to provide an active beater for which the correction relationship to be applied is relatively simple to determine.

Another object of the invention is to be able to select the desired level of damping (or "viscous resistance") freely.

Another object of the invention is to provide a dynamic beater which responds more quickly to transients than does a passive beater.

To achieve at least one of the above-specified objects, the idea on which the invention is based is to add an active component to the passive characteristic of the beater, thereby modifying its mechanical impedance, thus enabling the efficiency of the system to be increased.

The invention provides a mechanical force generator (actuator) between the mass M and the base structure. The actuator may be implemented in a variety of ways without that changing the principle or the objects of the invention:

an electrodynamic actuator (or "voice coil");

an electromagnetic actuator (of variable reluctance); or a piezoceramic or magnetostrictive actuator.

The invention thus provides a dynamic beater comprising a spring-mass unit, said unit having a mass M and a stiffness K actuated by a drive motor and presenting a device for coupling to a host structure for damping, the beater presenting a first acceleration sensor secured to said mass and delivering a first signal $s_1$, and a second acceleration sensor for mounting on the host structure and delivering a second signal $s_2$, and also having a power amplifier supplying an output signal for controlling the drive motor in response to an input signal E which is a function of a difference between the signals from the first and second acceleration sensors after passing at least one of said signals through at least one lowpass filter and/or phase delay type filter.

The beater may be such that:

$E = G_1(e_1 - G_2 e_2)$ where $G_1 = g_1/(1+p/\omega_1)$ and $G_2 = g_2/(1+p/\omega_2)$ with $\omega_1 = 2\pi f c_1$ $\omega_2 = 2\pi f c_2$ and $f c_1$ and $f c_2 < f_0/2$ $f_0 = \omega_0/2\pi$ designating the natural frequency of the beater with $\omega_0^2 = K/M$.

The invention also provides a beater, wherein:

$E = G_1(e_1 - G_2 e_2)$ where $G_1 = g_1(1+ap/\omega'_0)/(1+p/\omega'_0)$ and $G_2 = g_2/(1+p/\omega_2)$ with $a \geq 8$; $\omega'_0 = 2\pi f_0 a/4$ $\omega_2 = 2\pi f c_2$ and $f c_2 < f_0/2$ $f_0 = \omega_0/2\pi$ designating the natural frequency of the beater.

The invention also provides a method of using a dynamic beater as defined above, wherein its natural frequency $$f_0 = \frac{\sqrt{K/M}}{2\pi}$$

is advantageously selected to be substantially equal to be the frequency of a mode of the host structure, preferably the first mode of the host structure.

BRIEF DESCRIPTION OF THE DRAWINGS

Other characteristics of the invention appear on reading the following description given with reference to the drawings, in which:

FIGS. 8 to 10 relate to implementing filters that are more particularly suitable for damping a plurality of modes in a host structure, FIG. 8 showing the modulus (gain) and the phase of a bandpass type filter $F_1$, FIGS. 9a to 9c showing respectively the modulus and the phase of the response curves of the first loop in the open state (FIG. 9a), in the closed state (FIG. 9b), and the modulus and the phase of the second loop in the open state, while the first loop is closed (FIG. 9c), while FIG. 10 shows the gain obtained in the response on the host structure.

MORE DETAILED DESCRIPTION

Figure 1:
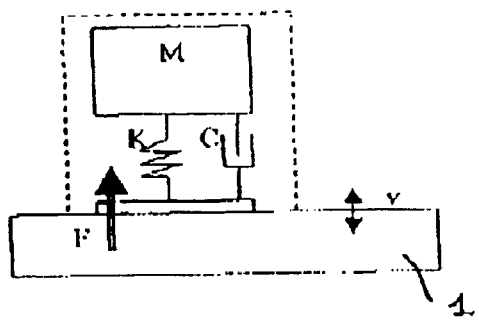
FIG. 1 is a generic diagram of a passive dynamic beater with viscous damping.

FIG. 1 shows a passive beater of mass M, of stiffness K corresponding to resonance at the frequency $f_0$, and presenting viscous damping C.

Figure 2:
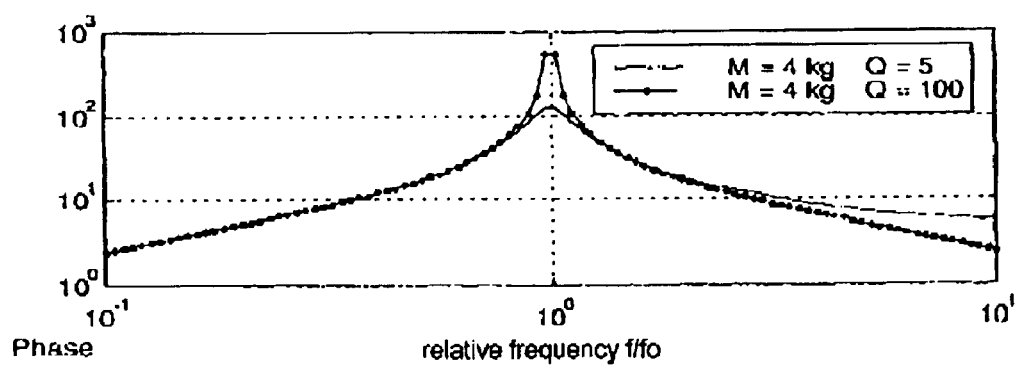
FIG. 2 shows the modulus and the phase of the impedance of such a beater as a function of frequency.
Figure 2:
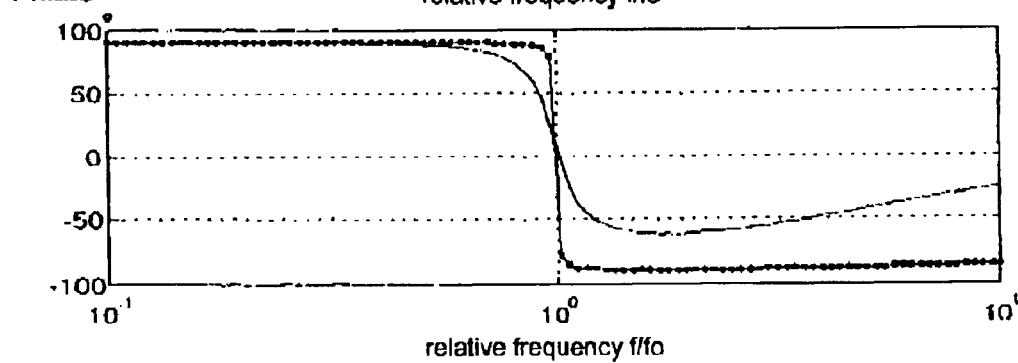

FIG. 2 shows the response curve (modulus and phase) of this passive beater.

Figure 3A:
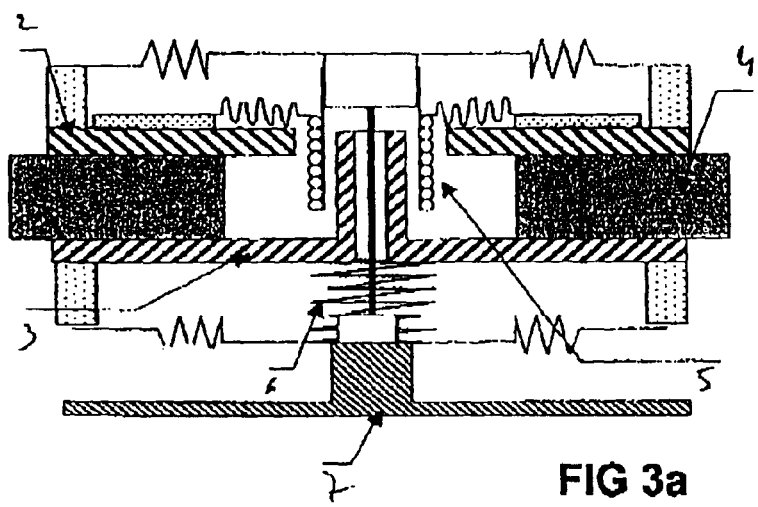
FIG. 3a shows an example of the mechanical architecture of an active beater of the invention, FIG. 3b showing an implementation of two servo-control loops.

In FIG. 3a, the mass M of the beater is constituted essentially by the magnetic circuit of the actuator, i.e. the top pole piece 2, the bottom pole piece 3, and the magnet 4.

The coil 5 of the actuator is connected to a base plate 7, and a spring 6 (e.g. a flexible blade) is interposed between the bottom pole piece 3 and the base plate 7.

The beater is advantageously tuned to the frequency $f_0$ of one of the modes of a structure 1 that is to be damped: this guarantees minimum power consumption since the force $F_a$ delivered by the actuator is then at a minimum. The mode in question is preferably the first mode of the structure 1 that is to be damped. In this configuration, there is no need to overdimension the actuator since it can take advantage of its own resonance.

However, this leads to a additional phase rotation in the transfer functions between the reference (amplifier input) and the accelerations (moving mass and structure).

The control architecture of the invention makes it possible to overcome the difficulty introduced by this phase shift: the first servo-control loop serves to find a transfer function in which phase rotation is reduced practically to zero over the entire working frequency band.

Additionally, if the device should cease to be "active" (loss of a sensor or loss of power), then the system behaves like a tuned passive beater, which constitutes an acceptable fallback situation.

The block diagram of the control system (FIG. 3b) has two successive servo-control loops:

a first loop for the accelerometer 11 (secured to the mass M); and a second loop for the accelerometer 12 (secured to the host structure 20).

The first loop is closed first, and then the second loop is closed, verifying on each occasion that the loops are stable with sufficient stability margin (margin in phase and in gain).

Figure 3B:
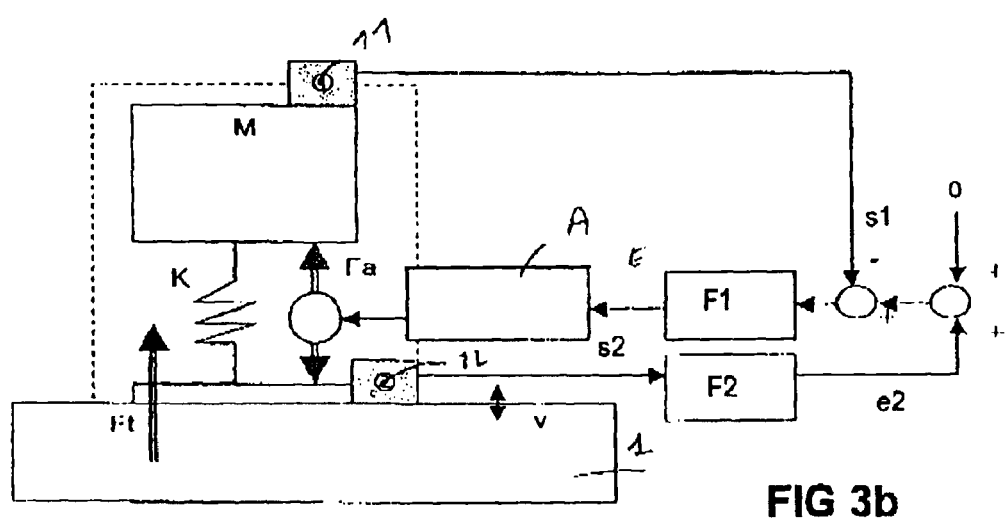

These two loops define a reference signal which is amplified and fed to the coil 5 of the actuator (symbolized in FIG. 3b by a force generator generating a force $F_a$)

The force $F_a$ is proportional to the reference signal E input to the power amplifier A:

if the amplifier operates as a voltage source, this assumption remains true so long as the frequency is below the electrical time constant of the actuator;

if the amplifier A operates with current servo-control, then this assumption remains true so long as the frequency lies within the band of frequencies in which the amplifier operates effectively as a current source (which corresponds to the frequency band with current servo-control). This frequency band is broader than that available when operating as a voltage source. This architecture is preferable when it is desired for the beater to operate on high frequency modes.

The first sensor 11 secured to the mass M generates an acceleration signal $s_1$ which is applied as negative feedback to the input of the power amplifier A after passing through a filter $F_1$ (first loop).

The second sensor 12 that is secured to the base structure 1 generates an acceleration signal $s_2$ that is filtered by a filter $F_2$ to produce a signal $e_2$, with the difference between $e_2$ and $s_1$ being applied to the input of the filter $F_1$. For the sake of form, the figure also shows a zero reference signal, since the idea is to calm the base structure 1 using the active beater, i.e. to cancel the difference between $s_1$ and $e_2$.

The beater is adjusted mechanically by tuning the beater, preferably to the frequency $f_0$ of the first mode of the structure 1. This guarantees minimum power consumption (minimum $F_a$).

When the base structure presents only one mode for damping, the filter $F_1$ is a first-order lowpass filter of response $G_1(p)$:

$G_1(p)=g_1/(1+p/\omega_1);$ $\omega_1=2\pi fc_1;$ $fc_1$=the cutoff frequency with $fc_1 < f_0/2$.

The gain $g_1$ needs to be as large as possible without giving rise to unstable behavior. One practical method is to detect the beginning of oscillation and to reduce $g_1$ by 6 decibels (dB) from such a limit value.

The filter $F_2$ is likewise a first-order lowpass filter of response $G_2(p)$:

$G_2(p)=g_2/(1+p/\omega_2);$ $\omega_2=2\pi fc_2;$ $fc_2$=the cutoff frequency with $fc_2 < f_0/2$.

The correction relationship (the gains $G_1$ and $G_2$ of the filters) is thus relatively easy to determine.

Figure 4:
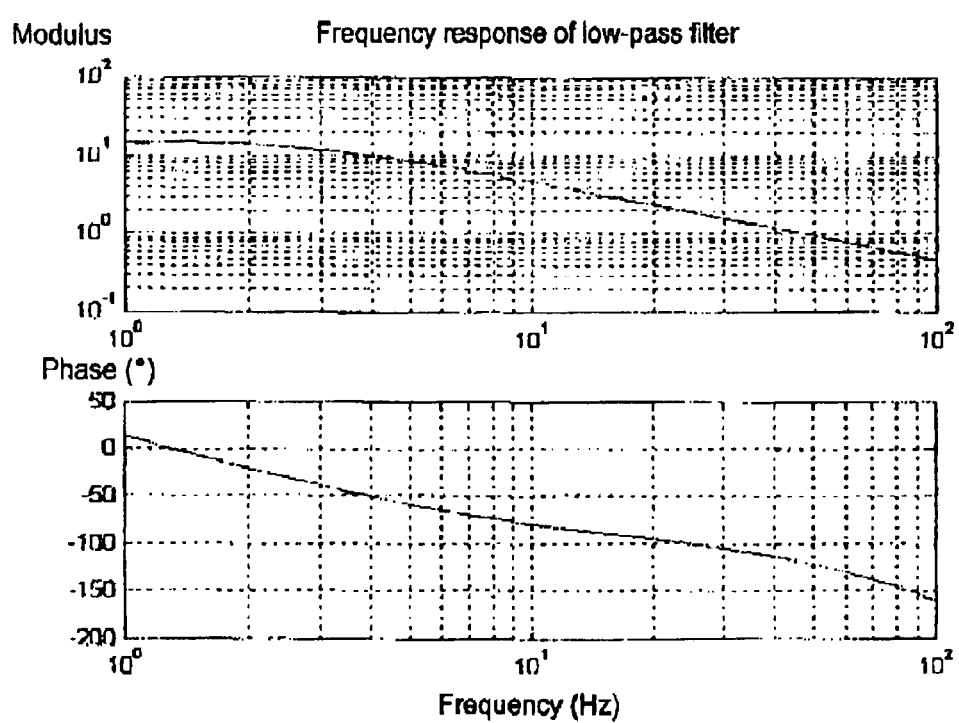
FIG. 4 is a plot showing the modulus and phase response of a lowpass filter used for the servo-control loop of the FIG. 3 beater, with the following FIGS. 5a to 7 showing implementations of lowpass filters for a host structure that presents a single mode for damping.

FIG. 4 shows the appearance of the gain and phase curves for the filters $F_1$ and $F_2$, taking account of degrading factors constituted by the presence of a first-order highpass filter in a piezoceramic accelerometer and a linear phase shift in a digital implementation (given by $(f/f_s) \times 360°$, where $f_s$ it the sampling frequency, and f is the frequency of the signal to be sampled).

Figure 5A:
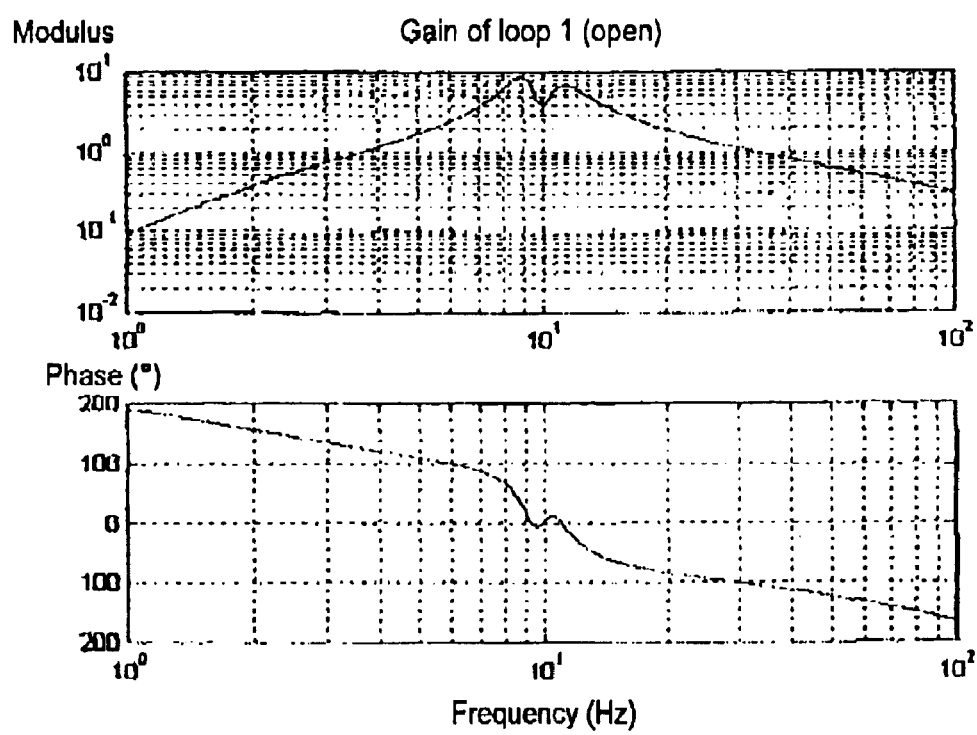
FIGS. 5a and 5b show the modulus and the phase of the response curve of the first loop in the open state (FIG. 5a) and in the closed state (FIG. 5b)
Figure 5B:
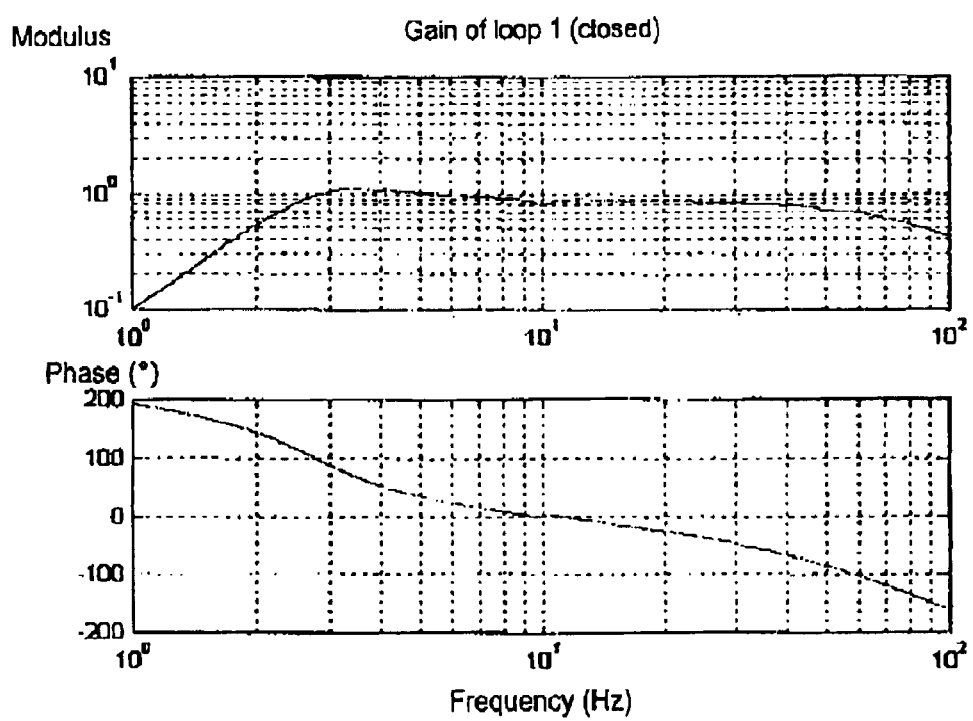

The gain of the first loop (when open) is given in FIG. 5a, and the gain of the same loop in the closed state is given in FIG. 5b.

Figure 5C:
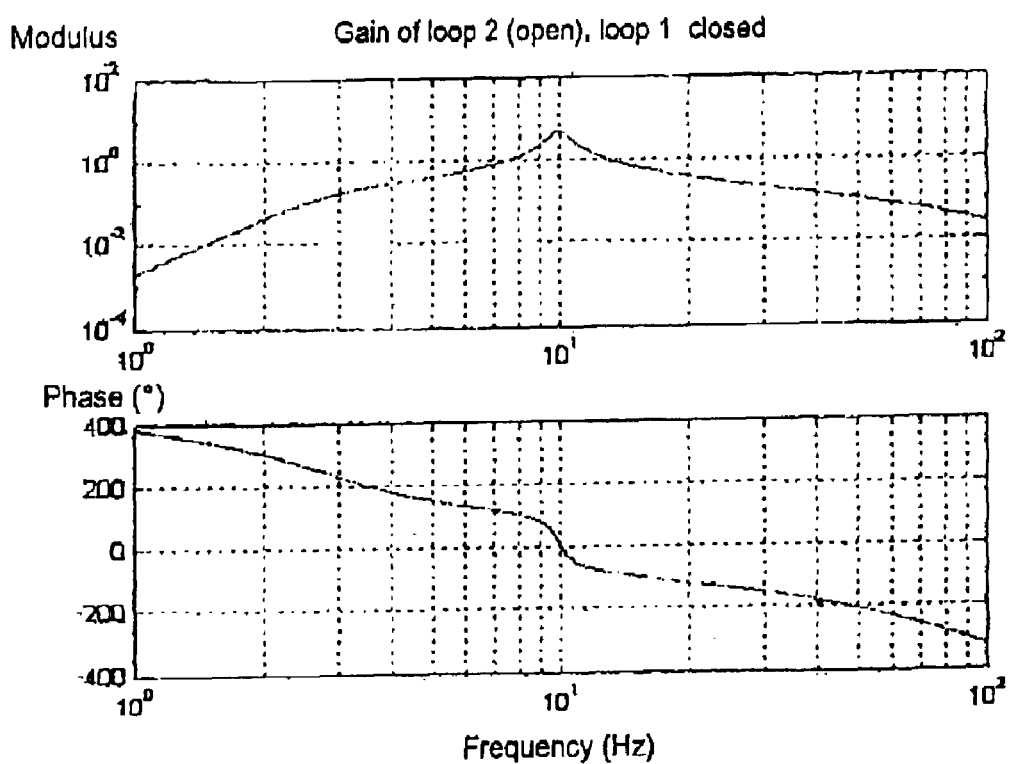
FIG. 5c shows the response curve when the first loop is closed and the second loop is open.
Figure 6:
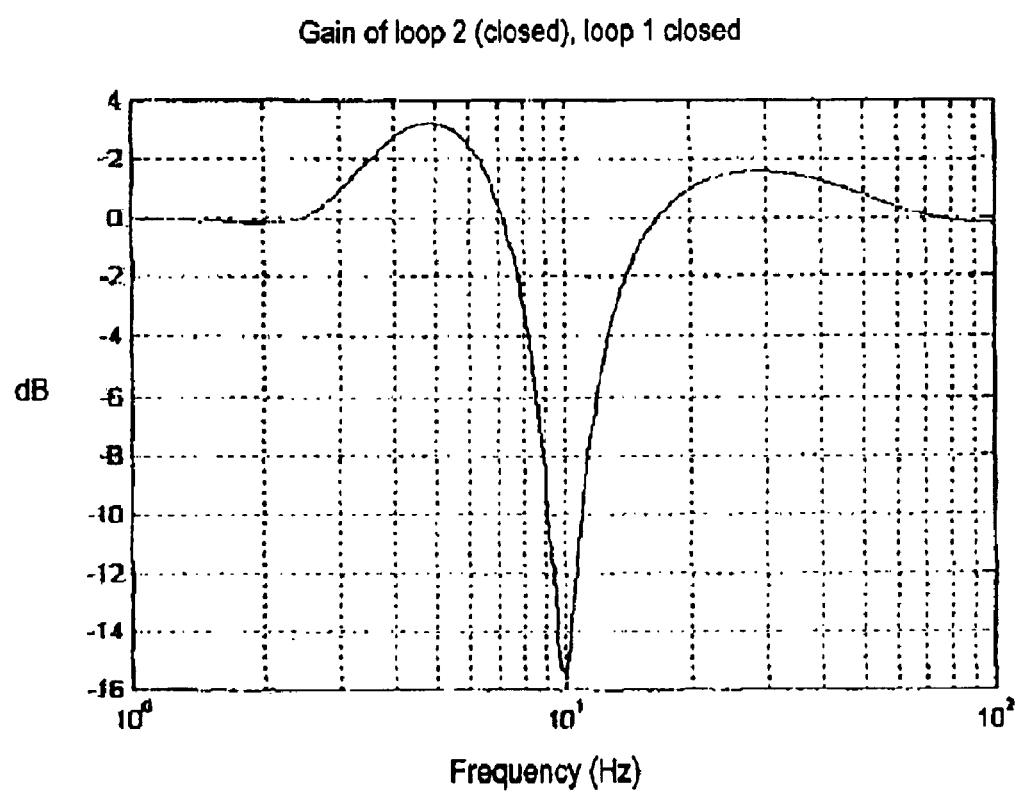
FIG. 6 shows an example of the vibratory gain (as a function of frequency) provided to the host structure by an active beater of the invention.
Figure 7:
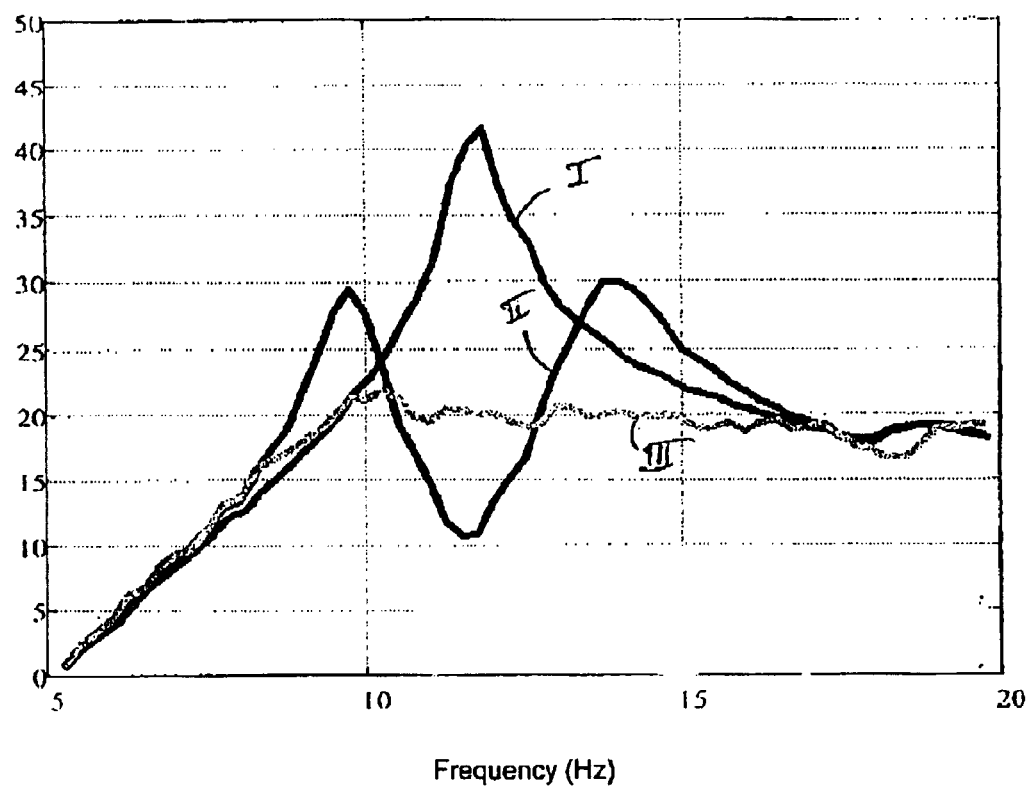
FIG. 7 plots three frequency response curves to excitations produced by a vibrating pot for the spring-mass unit, the spring being specifically a flexible blade (curve I), for the dynamic beater in passive mode (curve II), and finally for the dynamic beater in active mode in accordance with the invention (curve III)

FIG. 5c shows the gain of the second loop in the open state (while the first loop is closed). In the frequency band (in this case 8 hertz (Hz) to 12 Hz) where the gain (modulus) of this loop is greater than 1, vibratory gain is obtained on the host structure. This gain is shown in FIG. 6, with the gain reaching 16 dB in this case at the frequency $f_0$=10 Hz for the selected mode of the structure 1. However, it can be seen that outside resonance there is a small amount of degradation below and above the frequency $f_0$=10 Hz. The results of random excitation (white noise) using a vibrating pot are shown in FIG. 7.

Curve I corresponds to the response (acceleration) of the flexible blade+mass (no beater) to a disturbing force (delivered by the vibrating pot).

Curve II corresponds to the response (acceleration) of the flexible blade+mass+beater (in passive mode) to a disturbing force (supplied by the vibrating pot): this shows the conventional doubling of modes.

Curve III corresponds to the response (acceleration) of the flexible blade+mass+beater (in active mode) to a disturbing force (supplied by the vibrating pot): there is no longer the conventional doubling of modes, the system behaves like a system having a single degree of freedom, with a high level of damping.

Under transient conditions, and in passive beater mode, there can be seen a period of damping (to reach 5% of the initial amplitude) lasting 1.5 seconds (s) whereas it is 0.35 s in active beater mode (in accordance with the invention). Thus, in this example, damping takes place about four to five times more quickly than with a passive beater having the same mass and damping.

When the structure 1 for damping presents a plurality of modes, it is preferable to tune the frequency $f_0$ of the beater on the frequency of the first mode of the structure to be damped, i.e. on the mode whose frequency is lowest, or on the second mode, i.e. having a frequency that is the next frequency immediately greater than that of the first mode. This makes it possible to obtain a force $F_a$ of minimum magnitude and thus to minimize power consumption. Under such circumstances, the filter $F_1$ is selected to have a response $G'_1(p)$ giving it a phase delay function instead of a lowpass function.

For the filter $F_1$, it is possible to select:

$$G'_1(p) = g_1 \times \frac{(1+ap/[[j]]\omega'_0)}{(1+p/[[j]]\omega'_0)}$$

(phase delay filter)
with $a \geq 8$
the value of $a$ defines the passband of the system
$\omega'_0 = 2\pi f_0 \times a/4$.

The gain $g_1$ is selected to be as large as possible without giving rise to oscillation. One practical method is to increase $g_1$ until oscillation begins and then to reduce $g_1$ by 6 dB.

The filter $F_2$ can be selected as in the preceding embodiment.

Figure 8:
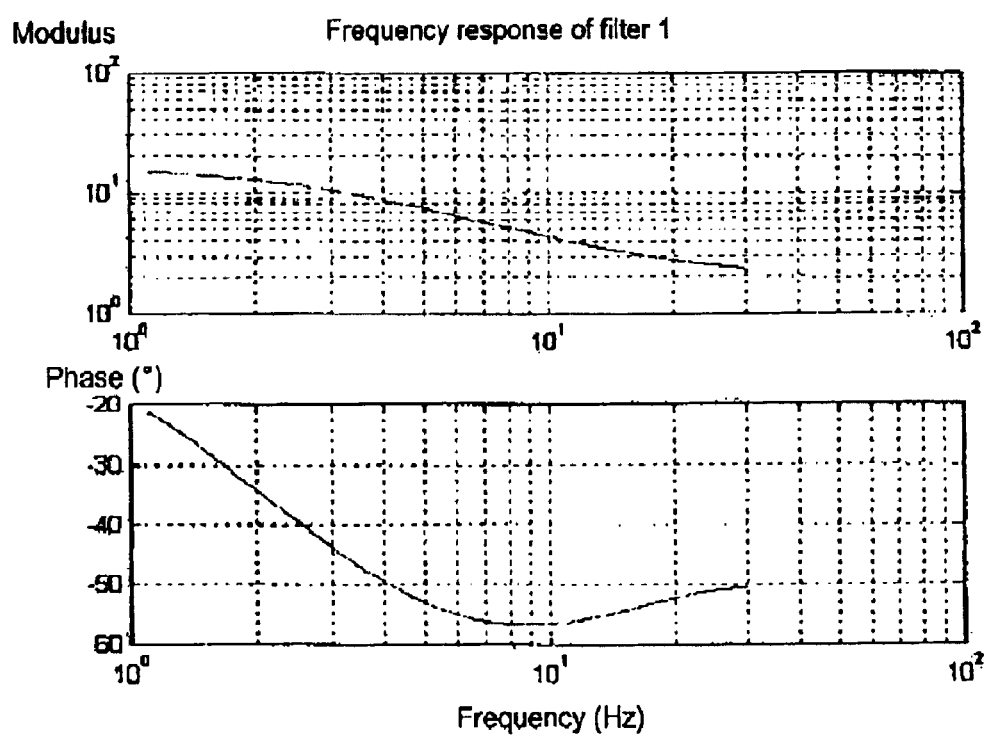
Figure 9A:
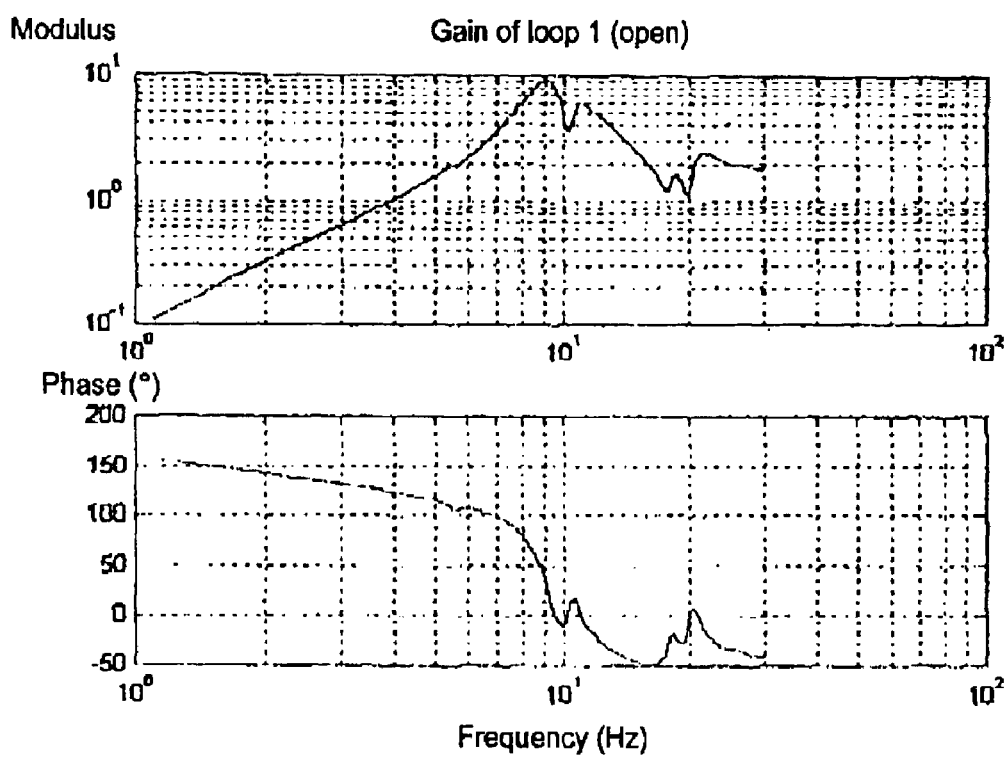
Figure 9B:
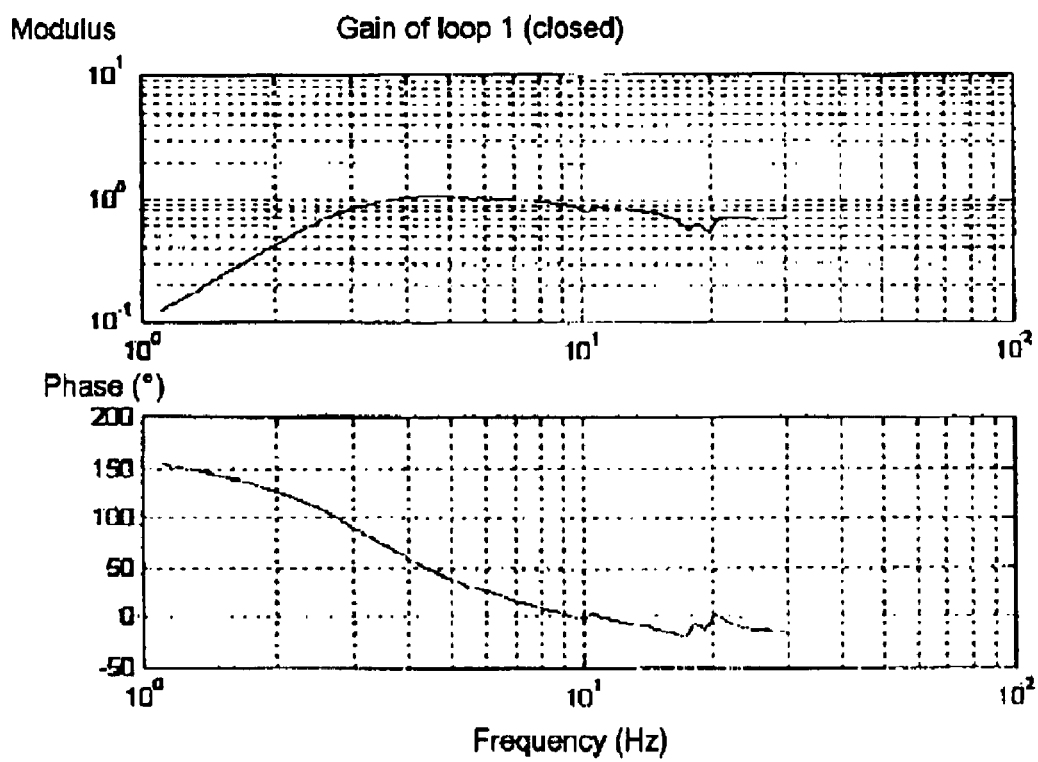
Figure 9C:
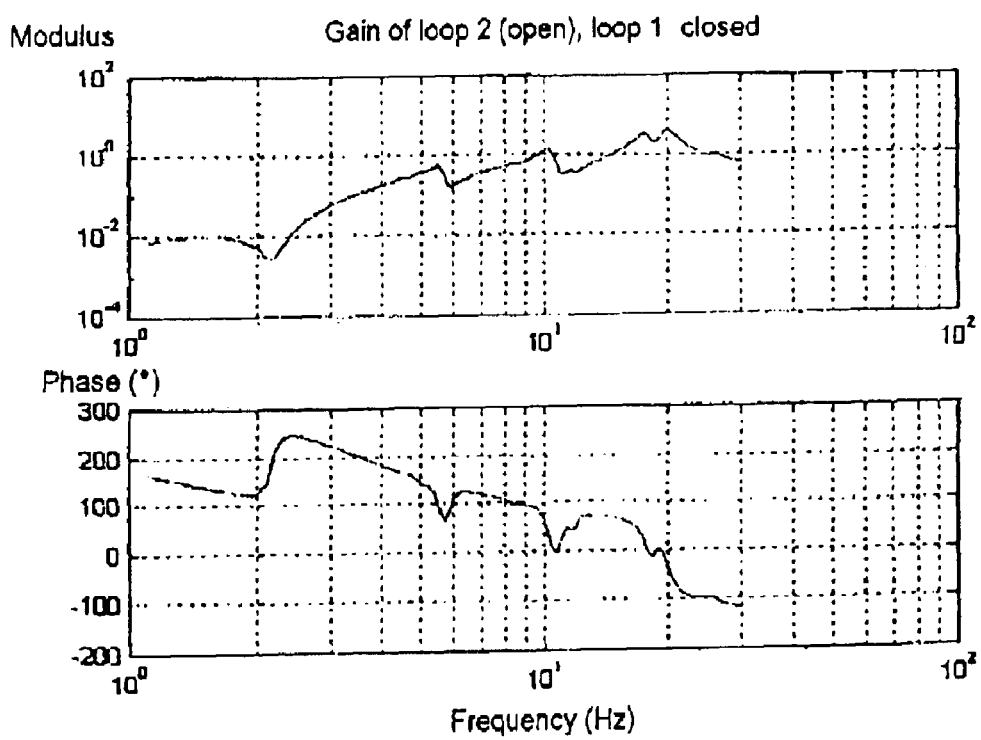

FIG. 8 shows the response curve of the filter $F_1$. A large phase delay effect can be seen around $f_0$=10 Hz, while gain is nevertheless conserved so as to give a lowpass filter appearance in the working frequency range. The first loop when closed (FIG. 9b) is more stable in phase than is the case in FIG. 5b.

Figure 10:
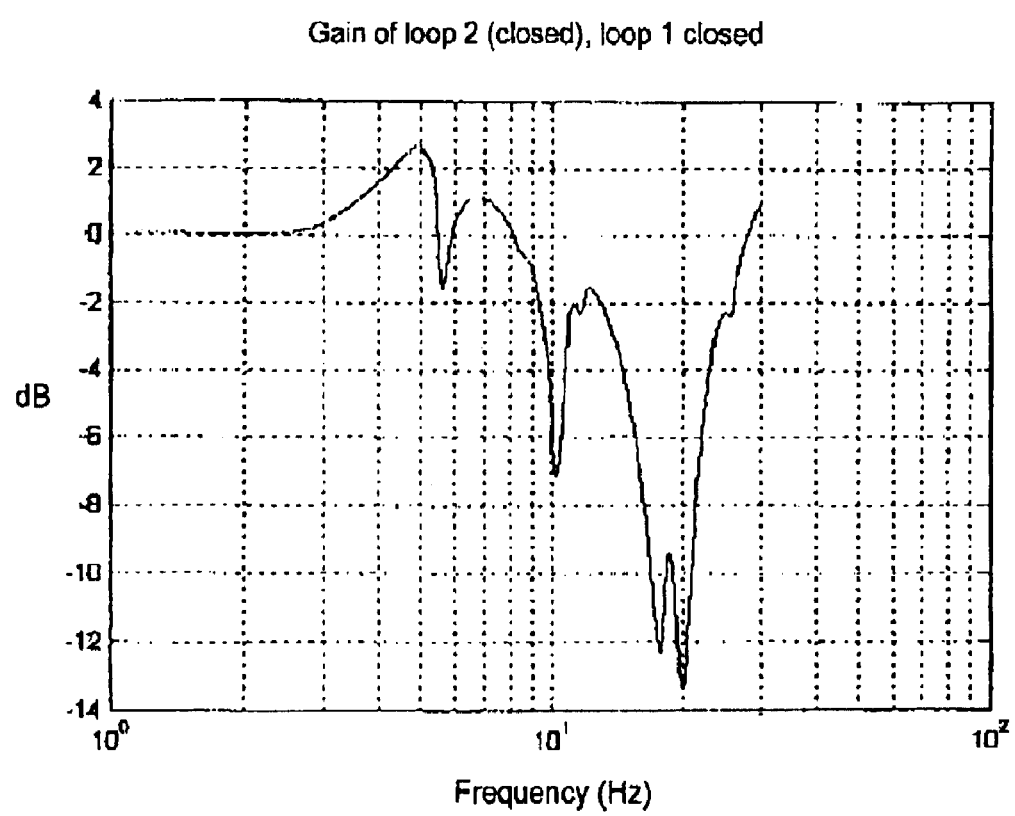

FIG. 10 shows the vibratory gain on a structure which presents four close-together modes for damping, i.e. a first mode at 6 Hz, a second mode (on which the frequency $f_0$ of the active beater is tuned) at 10 Hz, a third mode at 17 Hz, and finally a fourth node at 20 Hz. The second mode (at 10 Hz) is the first mode for which damping is desired. At 6 Hz, the vibratory gain is 2 dB, it is 7 dB at 10 Hz, 12 dB at 17 Hz, and 14 dB at 20 Hz. Implementing a phase delay filter $F_1$ thus makes it possible to extend the working frequency range of the active beater.

What is claimed is:

1. A dynamic beater comprising a vibrating mass unit having a mass M and a drive motor, said mass M being actuated by said drive motor to compensate for vibrations of a host structure, and a spring for coupling the mass unit to said host structure for damping, the beater presenting a first acceleration sensor secured to said mass and delivering a first signal $s_1$, and a second acceleration sensor for mounting on the host structure and delivering a second signal $s_2$, and also having a power amplifier supplying an output signal for controlling the drive motor in response to an input signal E which is a function of a difference between the signals from the first and second acceleration sensors after passing at least one of said signals through at least one lowpass filter and/or phase delay type filter, and including a first loop comprising a first said filter in series with said power amplifier, the first said filter having an inverting input for said first signal $s_1$; and a second loop comprising a second said filter having an input for said second signal $s_2$ and the second said filter having an output connected to a non-inverting input of the first said filter.

2. A dynamic beater comprising a spring mass unit, said unit having a mass M and a stiffness K actuated by a drive motor and presenting a device for coupling to a host structure for damping, the beater presenting a first acceleration sensor secured to said mass and delivering a first signal $s_1$, and a second acceleration sensor for mounting on the host structure and delivering a second signal $s_2$, and also having a power amplifier supplying an output signal for controlling the drive motor in response to an input signal E which is a function of a difference between the signals from the first and second acceleration sensors after passing at least one of said signals through at least one lowpass filter and/or phase delay type filter, wherein:

$E=G_1(e_1-G_2e_2)$ where $G_1=g_1/(1+p/\omega_1)$ and $G_2=g_2/(1+p/\omega_2)$ with $\omega_1=2\pi fc_1$ $\omega_2=2\pi fc_2$ and $fc_1$ and $fc_2 < f_0/2$ $f_0=\omega_0/2\pi$ designating the natural frequency of the beater with $\omega_0^2=K/M$.

3. A dynamic beater comprising a spring mass unit, said unit having a mass M and a stiffness K actuated by a drive motor and presenting a device for coupling to a host structure for damping, the beater presenting a first acceleration sensor secured to said mass and delivering a first signal $s_1$, and a second acceleration sensor for mounting on the host structure and delivering a second signal $s_2$, and also having a power amplifier supplying an output signal for controlling the drive motor in response to an input signal E which is a function of a difference between the signals from the first and second acceleration sensors after passing at least one of said signals through at least one lowpass filter and/or phase delay type filter, wherein:

$E=G_1(e_1-G_2e_2)$ where $G_1=g_1(1+ap/\omega'_0)/(1+p/\omega'_0)$ and $G_2=g_2/(1+p/\omega_2)$ with $a \geq 8$; $\omega'_0=2\pi f_0 a/4$ $\omega_2=2\pi fc_2$ and $fc_2 < f_0/2$ $f_0=\omega_0/2\pi$ designating the natural frequency of the beater.

4. A method of using a dynamic beater comprising a spring mass unit, said unit having a mass M and a stiffness K actuated by a drive motor and presenting a device for coupling to a host structure for damping, the beater presenting a first acceleration sensor secured to said mass and delivering a first signal $s_1$, and a second acceleration sensor for mounting on the host structure and delivering a second signal $s_2$, and also having a power amplifier supplying an output signal for controlling the drive motor in response to an input signal E which is a function of a difference between the signals from the first and second acceleration sensors after passing at least one of said signals through at least one lowpass filter and/or phase delay type filter, wherein the natural frequency of the beater $$f_0 = \frac{\sqrt{K/M}}{2\pi}$$

is selected to be substantially equal to the frequency of a mode of the host structure.

5. A method according to claim 4, wherein said mode is the first mode of the host structure for which damping is desired.

6. A method according to claim 4, wherein said mode is the first mode of the host structure.

* * * * *

UNITED STATES PATENT AND TRADEMARK OFFICE
CERTIFICATE OF CORRECTION

PATENT NO. : 6,935,471 B2  
APPLICATION NO. : 10/631692  
DATED : August 30, 2005  
INVENTOR(S) : Noe It is certified that error appears in the above-identified patent and that said Letters Patent is hereby corrected as shown below:

<u>Column 6,</u>  
Lines 36 through 39, the formula should read:

$$G'_1(p) = g_1 \times \frac{(1 + ap/\omega'_0)}{(1 + p/\omega'_0)}$$

Line 41, "with $a \geqq 8$" should read --with $a \geq 8$--.

Signed and Sealed this

Fifth Day of December, 2006

JON W. DUDAS  
*Director of the United States Patent and Trademark Office*